US007612974B2

(12) United States Patent
Kim et al.

(10) Patent No.: US 7,612,974 B2
(45) Date of Patent: Nov. 3, 2009

(54) BACKLIGHT UNIT HAVING PROTECTION CIRCUIT USING INDUCED VOLTAGE DETECTION

(75) Inventors: Hyo Young Kim, Gyunggi-do (KR); Sung Hun Oh, Gyunggi-do (KR); Jong Rak Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 26 days.

(21) Appl. No.: 11/946,700

(22) Filed: Nov. 28, 2007

(65) Prior Publication Data

US 2008/0137248 A1 Jun. 12, 2008

(30) Foreign Application Priority Data

Nov. 29, 2006 (KR) ..................... 10-2006-0119049

(51) Int. Cl.
*H02H 3/08* (2006.01)
*H02H 9/02* (2006.01)

(52) U.S. Cl. .................................................... 361/93.1

(58) Field of Classification Search ................. 361/93.1
See application file for complete search history.

(56) References Cited

FOREIGN PATENT DOCUMENTS

| | | | |
|---|---|---|---|
| KR | 1020010002829 | A | 1/2001 |
| KR | 1020030097393 | A | 12/2003 |
| KR | 1020050005905 | A | 1/2005 |
| KR | 1020050120879 | A | 12/2005 |
| KR | 1020060016224 | A | 2/2006 |
| KR | 1020060019268 | A | 3/2006 |

*Primary Examiner*—Ronald W Leja
(74) *Attorney, Agent, or Firm*—Lowe Hauptman Ham & Berner, LLP

(57) ABSTRACT

There is provided a backlight unit that determines whether a lamp performs an abnormal operation by detecting a voltage that is induced in a power conversion transformer without using a complicated and expensive detection circuit. A backlight unit having a protection circuit using induced voltage detection according to an aspect of the invention includes an inverter part including a primary coil receiving power and at least one secondary coil converting the power from the primary coil to AC power set beforehand, a lamp part including at least one lamp receiving the AC power from the inverter part to emit light, a detection part including conductors detecting voltages electromagnetically induced in the secondary coil, and an abnormality determining part comparing detection voltages from the detection part with a reference voltage set beforehand.

5 Claims, 5 Drawing Sheets

BACKLIGHT UNIT HAVING PROTECTION CIRCUIT USING INDUCED VOLTAGE DETECTION

CROSS-REFERENCE TO RELATED APPLICATIONS

This application claims the priority of Korean Patent Application No. 2006-119049 filed on Nov. 29, 2006, in the Korean Intellectual Property Office, the disclosure of which is incorporated herein by reference.

BACKGROUND OF THE INVENTION

1. Field of the Invention

The present invention relates to a backlight unit having a protection circuit using induced voltage detection, and more particularly, to a backlight unit having a protection circuit using induced voltage detection that determines whether a lamp performs an abnormal operation by detecting a voltage induced in a power conversion transformer.

2. Description of the Related Art

In recent years, liquid crystal displays (LCDs) have received a lot of attention in that they can be reduced in size and weight as compared with the existing displays. Among the LCDs, especially LCD TVs have attracted attention. The LCD includes a backlight unit that emits light.

FIG. 1 is a configuration view illustrating a backlight unit according to the related art.

Referring to FIG. 1, a backlight unit according to the related art includes an inverter 10, a lamp group 20, adetection circuit 30, and a determination circuit 40. The inverter 10 includes a switching part 11 that switches DC power and a power conversion transformer 12 that converts the switched power into AC power that is required for driving lamps. The lamp group 20 includes a plurality of lamps each of which receives the AC power from the inverter 10 to emit light. The detection circuit 30 detects voltages that are supplied to the individual lamps from output terminals of the power conversion transformer 12. The determination circuit 40 compares each of the voltages that are detected by the detection circuit 30 with a reference voltage that is set beforehand so as to determine an abnormal operation of each of the lamps.

The detection circuit 30 that is used in the backlight unit according to the related art includes a plurality of detection elements C1, C2, C3, and C4 and a plurality of stabilizing elements C5, C6, C7, and C8.

Pairs of the detection elements C1, C2, C3, and C4 and the stabilizing elements C5, C6, C7, and C8 are connected in series with each other. The pairs are individually connected in parallel with the output terminals of the power conversion transformer 12.

The detection circuit 30 that is connected to the output terminals of the power conversion transformer 12 detects a voltage that is transmitted to each of the lamps, and transmits the detected voltage to the determination circuit 40. The detection circuit 40 compares the voltage detected by the detection circuit 30 with the reference voltage set beforehand so as to determine whether the corresponding lamp performs an abnormal operation. When the lamp performs the abnormal operation, the power conversion transformer 12 controls a switching operation of the switching part 11 of the inverter 10 to thereby cut off power supply of the inverter 10.

Each of the plurality of detection elements C1, C2, C3, and C4 of the detection circuit 30 may use a high-voltage discrete capacitor or a pattern capacitor to detect the voltage that is transmitted from the power conversion transformer 12 to each of the lamps.

When the voltage transmitted to each of the lamps is detected by using the high-voltage discrete capacitor, a circuit area is reduced as required to mount the high-voltage discrete capacitor. Further, since the high-voltage discrete capacitor is expensive, and a process of mounting the high-voltage discrete capacitor is required, manufacturing costs are increased.

When the pattern capacitor is used to detect the voltage transmitted to each of the lamps, a double sided printed circuit board is required in order to use the pattern capacitor. Further, the pattern capacitor needs to be formed of CTI 600 so that the double sided PCB has a desired dielectric constant, which results in an increase in manufacturing costs.

SUMMARY OF THE INVENTION

An aspect of the present invention provides a backlight unit having a protection circuit using induced voltage detection that determines whether a lamp performs an abnormal operation by detecting a voltage that is induced in a power conversion transformer without using a complicated and expensive detection circuit.

According to an aspect of the present invention, there is provided a backlight unit having a protection circuit using induced voltage detection, the backlight unit including: an inverter part including a primary coil receiving power and at least one secondary coil converting the power from the primary coil to AC power set beforehand; a lamp part including at least one lamp receiving the AC power from the inverter part to emit light; a detection part including conductors detecting voltages electromagnetically induced in the secondary coil; and an abnormality determining part comparing detection voltages from the detection part with a reference voltage set beforehand.

The primary coil and the secondary coil of the inverter part may form one transformer, the primary coil and the secondary coil may be wound around a bobbin of the transformer and separated from each other, and the conductors of the detecting part may be inserted into the bobbin of the transformer. Further, the conductors may be separated from output terminals of the secondary coil transmitting the AC power to the lamp by an insulating distance set beforehand.

The conductors may be floating terminals, which are not connected to the primary coil and the secondary coil, among terminals of the transformer.

The detection part may further include level control elements controlling levels of the detection voltages from the conductors, and capacitors stabilizing the detection voltages from the conductors. The level control elements may be composed of capacitors or resistors.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. However, in description of operation principles associated with the embodiments of the present invention, detailed description of a known art or construction is omitted because it may obscure the spirit of the present invention unnecessarily.

Figure 1:
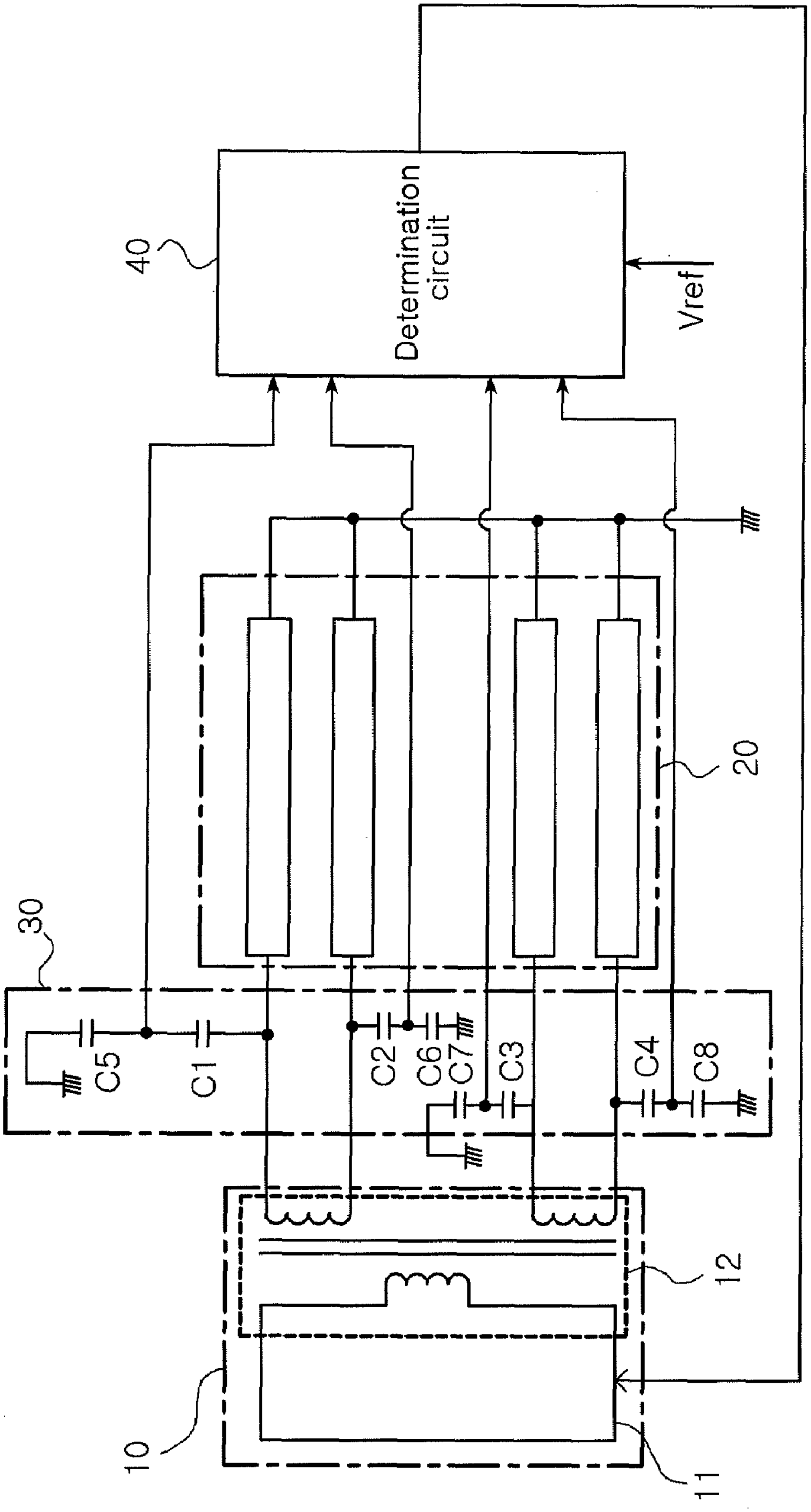
PRIOR ART FIG. 1
FIG. 1 is a configuration view illustrating a backlight unit according to the related art.
Figure 2:
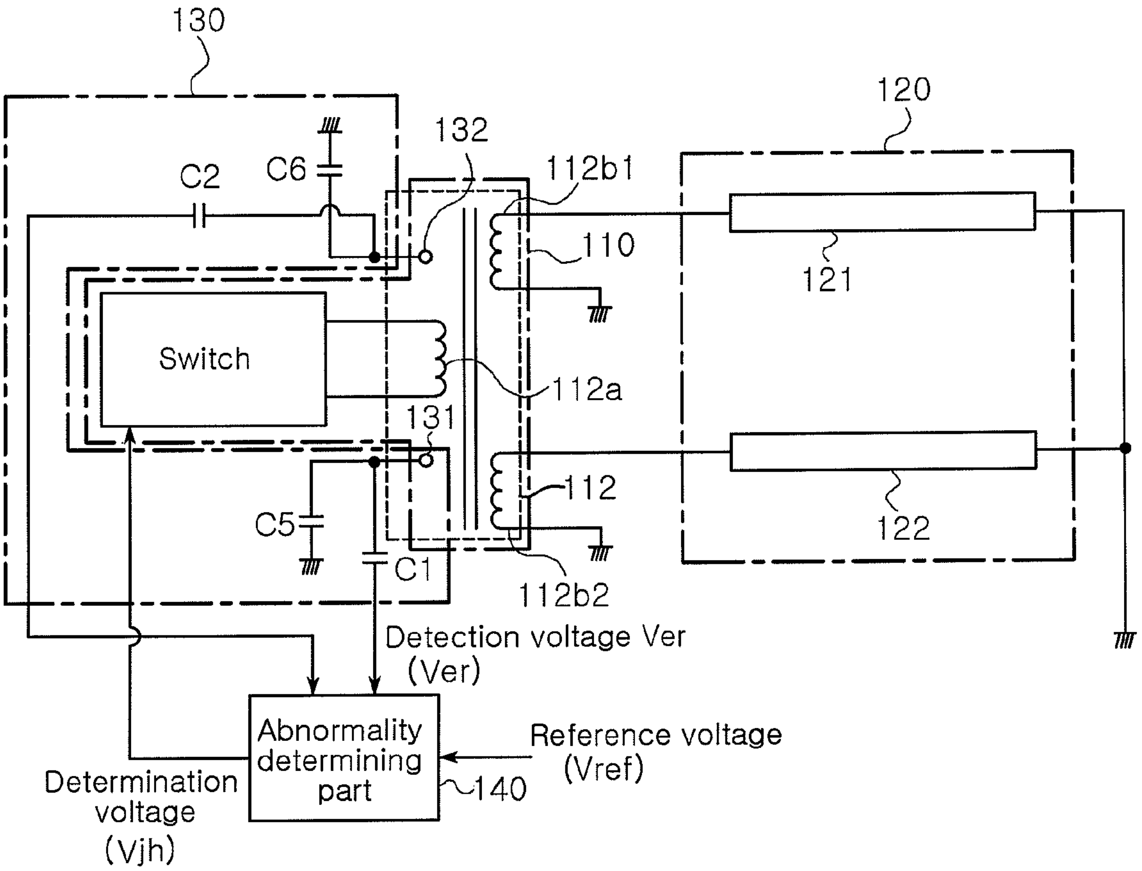
FIG. 2 is a configuration view illustrating a backlight unit according to an exemplary embodiment of the present invention.

FIG. 2 is a configuration view illustrating a backlight unit according to an exemplary embodiment of the present invention.

Referring to FIG. 2, a backlight unit 100 according to an exemplary embodiment of the present invention includes an inverter part 110, a lamp part 120, a detection part 130, and an abnormality determining part 140.

The inverter part 110 may include a switch 111 and a transformer 112. The switch 111 switches DC power and transmits the switched DC power to the transformer 112.

The transformer 112 includes a primary coil 112*a* and one or more secondary coils 112*b*1 and 112*b*2. Preferably, the number of secondary coils 112*b*1 and 112*b*2 is in proportion to the number of lamps. Here, the two secondary coils 112*b*1 and 112*b*2 are shown in FIG. 2, but the present invention is not limited thereto.

The lamp part 120 includes one or more lamps 121 and 122. As described above, the number of lamps is preferably in proportion to the number of secondary coils. Here, the two lamps 121 and 122 are shown in FIG. 2, but the present invention is not limited thereto. The lamps 121 and 122 are connected to ends of the secondary coils 112*b*1 and 112*b*2, respectively, and receive AC power to emit light.

The detection part 130 includes one or more conductors 131 and 132. Preferably, the number of conductors is in proportion to the number of secondary coils. Here, the two conductors 131 and 132 that correspond to the secondary coils 112*b*1 and 112*b*2, respectively, are shown in FIG. 2. Preferably, the above-described conductors 131 and 132 are formed at positions corresponding to lamp output terminals of the secondary coils 112*b*1 and 112*b*2, respectively. Further, the conductors 131 and 132 may be included in the transformer 112, which will be described in detail with reference to FIG. 3.

The detection part 130 may further include level control elements C1 and C2 and capacitors C5 and C6 that are connected in series with the conductors 131 and 132, respectively. The level control elements C1 and C2 may be composed of capacitors or resistors.

The abnormality determining part 140 receives a detection voltage Ver from each of the conductors 131 and 132, and a reference voltage Vref that is set beforehand, and transmits a determination voltage vju to the inverter part 110. Preferably, the abnormality determining part 140 transmits the determination voltage vju to the switch 111 of the inverter part 110.

Figure 3:
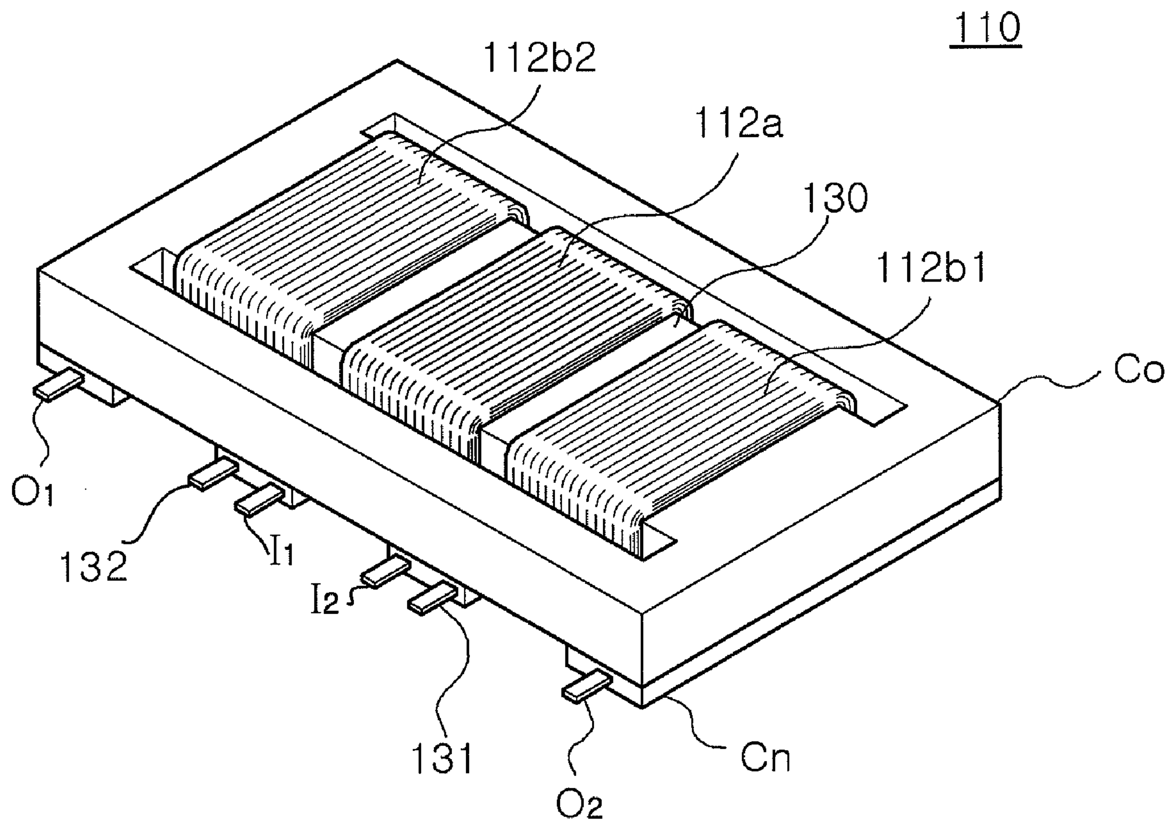
FIG. 3 is a configuration view illustrating one example of a power conversion transformer that is used in the backlight unit according to the exemplary embodiment of the present invention.

FIG. 3 is a configuration view illustrating one example of a power conversion transformer that is used in the backlight unit according to the exemplary embodiment of the present invention.

Referring to FIG. 3, the inverter part 110 of the backlight unit 100 according to the exemplary embodiment of the present invention includes a power conversion transformer 112.

The power conversion transformer 112 includes a bobbin Bo and a core Co. The bobbin Bo is a stationary part where each of the primary coil 112*a* and the secondary coils 112*b*1 and 112*b*2 is wound according to a winding ratio that is set beforehand. The core Co is coupled to the bobbin Bo and forms magnetic paths by electromagnetic induction between the primary coil 112*a* and the secondary coils 112*b*1 and 112*b*2.

The primary coil 112*a* receives the power switched by the switch 111 through input terminals I1 and I2 of a terminal Cn that is formed on the bobbin Bo. The power that is induced by the electromagnetic induction between the primary coil 112*a* and the secondary coils 112*b*1 and 112*b*2 is transmitted to the lamp part 120 through respective output terminals O1 and O2 of the secondary coils 112*b*1 and 112*b*2.

The conductors 131 and 132 of the above-described detection part 130 may be formed on the terminal Cn while each of the conductors 131 and 132 is separated from each of the input terminals I1 and I2 of the primary coil 112*a* or each of the output terminals O1 and I2 of the secondary coils 112*b*1 and 112*b*2 by an insulating distance that is set beforehand. Preferably, the conductors 131 and 132 may be floating terminals, which are not used to input and output power, among terminals that are formed on the terminal Cn.

Figure 4:
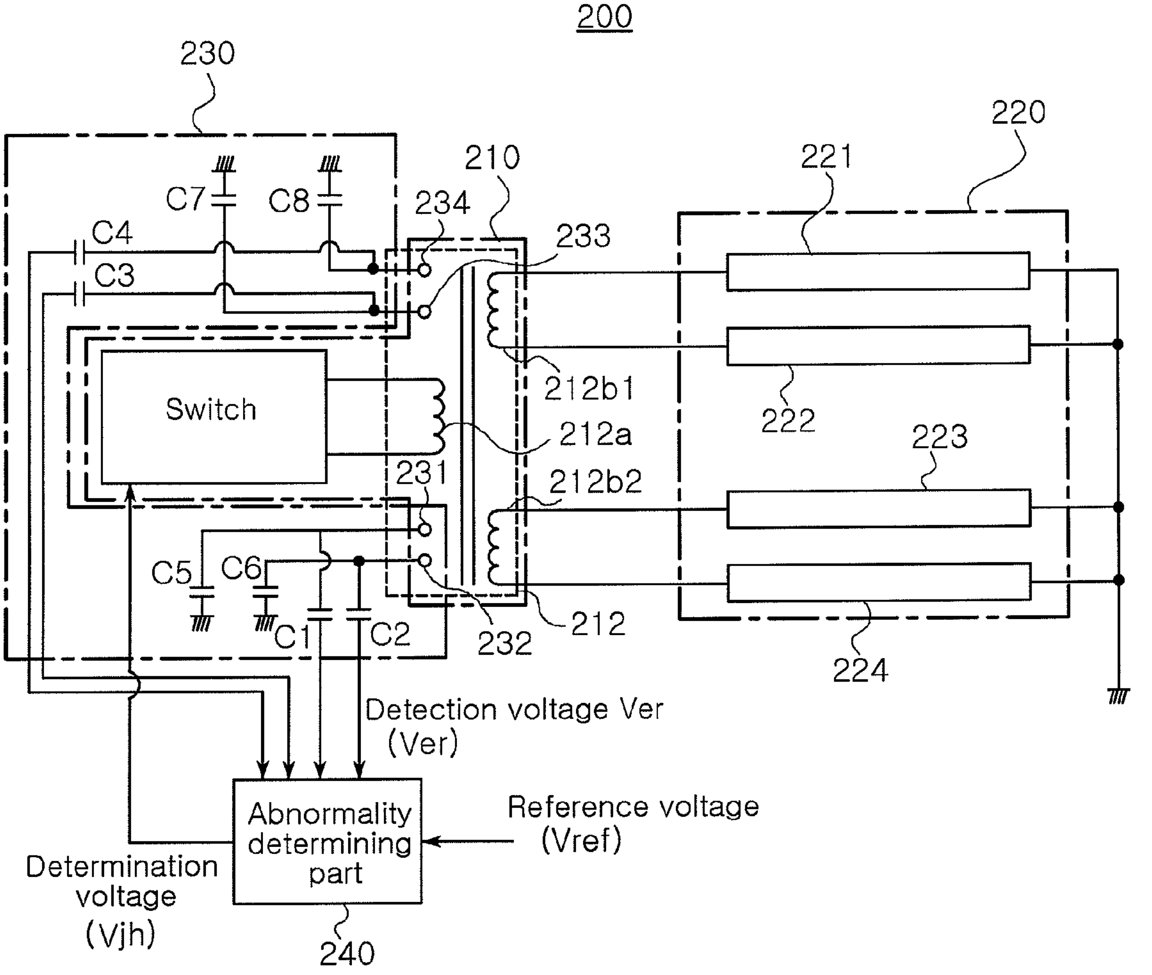
FIG. 4 is a configuration view illustrating a backlight unit according to another exemplary embodiment of the present invention.

FIG. 4 is a configuration view illustrating a backlight unit according to another exemplary embodiment of the present invention.

Referring to FIG. 4, a transformer 212 according to another exemplary embodiment of the present invention includes secondary coils 212*b*1 and 212*b*2. One end and the other end of each of the secondary coils 212*b*1 and 212*b*2 can transmit AC power to lamps. Here, there may be four lamps in proportion to the secondary coils 212*b*1 and 212*b*2. That is, a lamp part 220 includes lamps 221, 222, 223, and 224. Further, a detection part 230 may include four conductors 231, 232, 233, and 234 according to the number of lamps such that each of the conductors detects a voltage transmitted to each of the lamps.

Since a switch 211 of an inverter part 210, level control elements C1, C2, C3, and C4, capacitors C5, C6, C7, and C8, and an abnormality determining part 240 shown in FIG. 4 are the same as those described in FIG. 2, the description thereof will be omitted.

Figure 5:
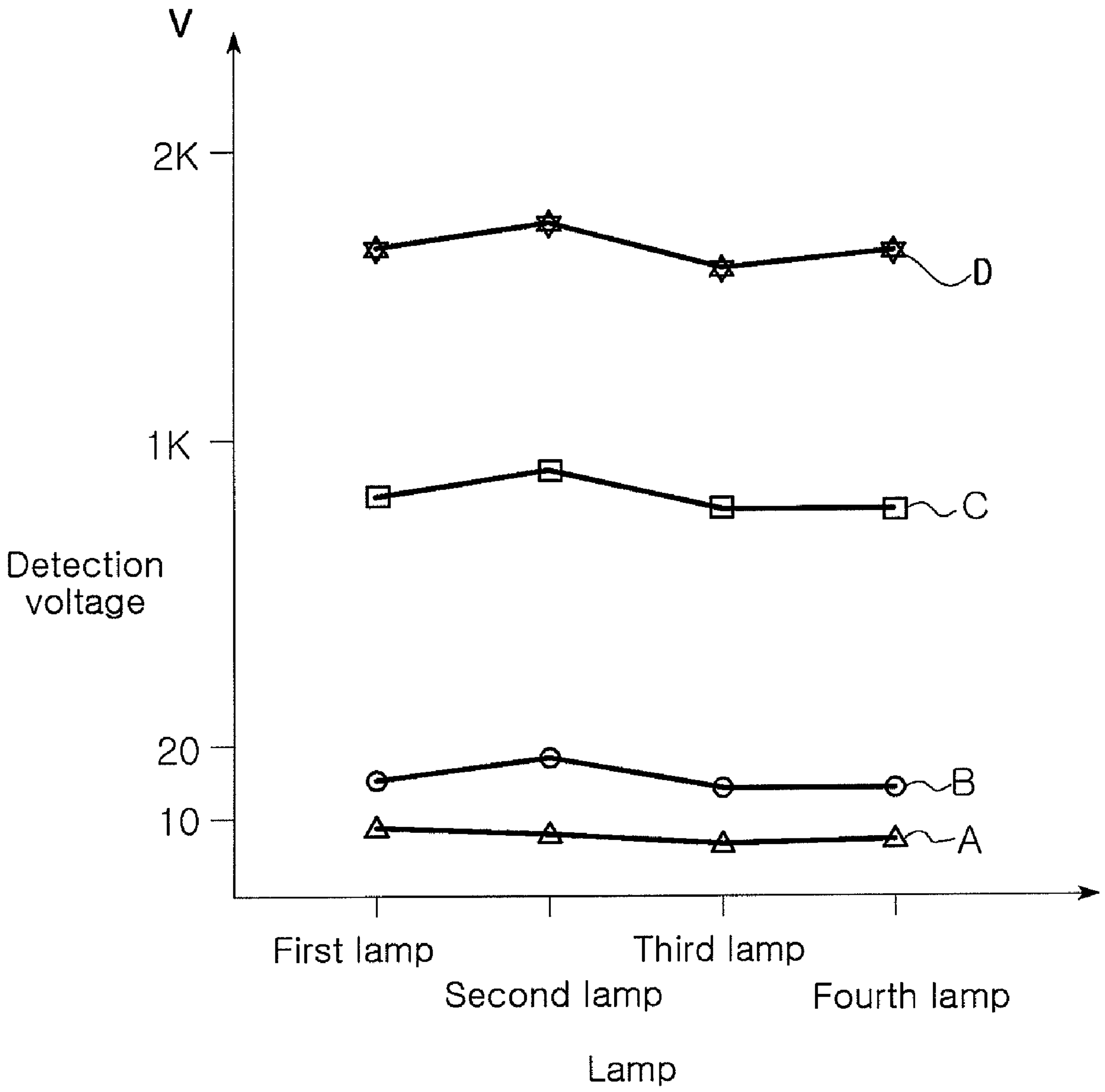
FIG. 5 is a graph illustrating detection voltages of the backlight unit according to the present invention.

FIG. 5 is a graph illustrating detection voltages of a backlight unit according to the present invention.

The conductors 231, 232, 233, and 234 of the detection part 230 detect voltages according to the voltages of the secondary coils 212*b*1 and 212*b*2 when the lamps perform normal operations or abnormal operations. Here, the detected voltages are shown in FIG. 5.

Hereinafter, the operation and effect of the present invention will be described in detail with reference to the accompanying drawings.

Referring to FIGS. 2 and 3, DC power is switched by the switch 111 of the inverter part 110 and transmitted to the transformer 112. The DC power that is switched by the switch 111 is input to the primary coil 112*a* of the transformer 112. The switched DC power is converted into AC power by electromagnetic induction between the primary coil 112*a* and the secondary coils 112*b*1 and 112*b*2 each of which has the winding ratio set beforehand. Then, the AC power is transmitted to each of the lamps 121 and 122 of the lamp part 120 through each of the output terminals of the secondary coils 112*b*1 and 112*b*2.

Each of the conductors 131 and 132 of the detection part 130 is separated from each of the input terminals I1 and I2 of the primary coil 112*a* or each of the output terminals O1 and I2 of the secondary coils 112*b*1 and 112*b*2 by the insulating distance that is set beforehand so as to detect voltages that are induced in the secondary coils 112*b*1 and 112*b*2 by the electromagnetic induction. The insulating distance set beforehand may vary according to electrical conditions of the transformer. For example, when a withstanding voltage of the transformer is 5 KV, the insulating distance is preferably 5 mm or more.

The lamps 121 and 122 receive the AC power that is transmitted through the output terminals of the secondary coils 112*b*1 and 112*b*2, respectively, and emit light. In this way, each of the lamps 121 and 122 performs a normal operation. When the lamps 121 and 122 may be open circuit due to aging of the lamps 121 and 122 or a short circuit of power input terminals, the lamps 212 and 122 cannot emit light. At this time, impedance of one lamp that performs an abnormal operation is different from that of the other lamp that performs the normal operation. This difference results in a change of the power that is induced in the secondary coils. Further, the change in the induced power results in a change in the power that is input to the primary coil.

That is, the impedance of the lamp performing the abnormal operation becomes larger than that of the lamp performing the normal operation. Further, the voltages that are induced in the secondary coils are increased by LC resonance of the transformer 112.

Referring to FIG. 3, the conductors 131 and 132 of the detection part 130 are located adjacent to the input terminals I1 and I2 of the primary coil 112*a*, respectively. However, a voltage that is input to the primary coil 112*a* is DC 24 V, and voltages that are induced in the secondary coils 112*b*1 and 112*b*2 are approximately AC 700 V. Therefore, even though the conductors 131 and 132 are located adjacent to the input terminals I1 and I2 of the primary coil 112*a*, the conductors 131 and 132 can detect the voltages that are induced in the secondary coils.

The conductors 131 and 132 of the detection part 130 detect the voltages that are induced in the secondary coils when the lamps perform abnormal operations, and transmit detection voltages Ver to the abnormality determining part 140. Before the detection voltages Ver are transmitted to the abnormality determining part 140, the level control elements C1 and C2 control levels of the detection voltages Ver so that the detection voltages Ver can be applied to the abnormality determining part 140. Further, the detection voltages Ver, whose levels are controlled, are stabilized by the capacitors C5 and C6, and then transmitted to the abnormality determining part 140.

The abnormality determining part 140 compares each of the detection voltages Ver with the reference voltage Vref that is set beforehand. When any one of the detection voltages Ver is larger than the reference voltage Vref, the abnormality determining part 140 determines that the corresponding lamp performs the abnormal operation, and transmits a corresponding determination voltage vju to the inverter part 110.

The switch 111 of the inverter part 110 is turned off according to the determination voltage vju so as to cut off power supply of the inverter part 110.

The operation of the backlight unit according to the exemplary embodiment of the present invention is the same as the operation as described above with reference to FIG. 2. However, referring to FIG. 4, one end and the other end of the secondary coil 212*b*1 supply the AC power to the lamps 221 and 222, respectively, and one end and the other end of the secondary coil 212*b*2 supply the AC power to the lamps 223 and 224. In order to detect abnormal operations of the lamps, the detection part 230 includes the four conductors 231, 232, 233, and 234 that detect voltages from one end and the other end of each of the secondary coils 212*b*1 and 212*b*2.

Referring to FIG. 5, the voltages that are detected by the conductors 231, 232, 233, and 234 are shown.

A voltage C of when each of the lamps 221, 222, 223, and 224 performs a normal operation, and a voltage D of when each of the lamps 221, 222, 223, and 224 performs an abnormal operation are shown in FIG. 5. A voltage that is obtained by detecting the voltage C when each of the lamps 221, 222, 223, and 224 performs the normal operation is a detection voltage A. A voltage that is obtained by detecting the voltage D when each of the lamps 221, 222, 223, and 224 performs the abnormal operation is a detection voltage B.

As shown in FIG. 5, conductors that are included in a transformer detect voltages that are induced in the secondary coils without using an expensive detection device so as to determine whether lamps perform abnormal operations, such that it is possible to protect the lamps or the transformer.

As set forth above, according to exemplary embodiments of the invention, voltages induced in secondary coils that transmit power to lamps are detected by conductors included in a transformer without using an expensive detection device, thereby increasing an available circuit area and reducing the unit cost.

While the present invention has been shown and described in connection with the exemplary embodiments, it will be apparent to those skilled in the art that modifications and variations can be made without departing from the spirit and scope of the invention as defined by the appended claims.

What is claimed is:

1. A backlight unit having a protection circuit using induced voltage detection, the backlight unit comprising:

an inverter part including a primary coil configured to receive power and at least one secondary coil and to convert the power from the primary coil to AC power set beforehand;

a lamp part including at least one lamp configured to receive the AC power from the inverter part to emit light;

a detection part including conductors configured to detect voltages electromagnetically induced in the secondary coil; and an abnormality determining part configured to compare detection voltages from the detection part with a reference voltage set beforehand;

wherein the primary coil and the secondary coil of the inverter part form one transformer;

wherein the primary coil and the secondary coil are wound around a bobbin of the transformer and separated from each other;

wherein the conductors of the detecting part are inserted into the bobbin of the transformer;

wherein the conductors are separated from output terminals of the secondary coil by a predetermined insulating distance; and wherein the conductors are floating terminals among terminals of the transformer, and are not connected to either the primary coil or the secondary coil.

2. The backlight unit of claim 1, wherein the detection part further comprises:

level control elements controlling levels of the detection voltages from the conductors; and capacitors stabilizing the detection voltages from the conductors.

3. The backlight unit of claim 2, wherein the level control elements are composed of capacitors or resistors.

4. The backlight unit of claim 1, wherein the conductors of the detector part are not connected to any transformer coil.

5. A backlight unit having a protection circuit using induced voltage detection, the backlight unit comprising:

an inverter part including a primary coil configured to receive power and at least one secondary coil and to convert the power from the primary coil to AC power set beforehand;

a lamp part including at least one lamp configured to receive the AC power from the inverter part to emit light;

a detection part including conductors configured to detect voltages electromagnetically induced in the secondary coil; and an abnormality determining part configured to compare detection voltages from the detection part with a reference voltage set beforehand;

wherein the primary coil and the secondary coil of the inverter part form one transformer;

wherein the primary coil and the secondary coil are wound around a bobbin of the transformer and separated from each other; and wherein the conductors of the detecting part are floating terminals inserted into the bobbin of the transformer and have no electrical connection to any coil of the transformer.

* * * * *